United States Patent [19]

Balsells

[11] Patent Number: 4,961,253
[45] Date of Patent: Oct. 9, 1990

[54] MANUFACTURING METHOD FOR CANTED-COIL SPRING WITH TURN ANGLE AND SEAL

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 283,912

[22] Filed: Dec. 13, 1988

Related U.S. Application Data

[62] Division of Ser. No. 186,017, Apr. 25, 1988, Pat. No. 4,830,344.

[51] Int. Cl.$^5$ ............................................. B21F 35/00
[52] U.S. Cl. ........................................................ 29/173
[58] Field of Search ................... 29/173; 267/1.5, 166, 267/167, 180; 277/157, 158, 163, 164, 205, 206, 235

[56] References Cited

U.S. PATENT DOCUMENTS

| | | | |
|---|---|---|---|
| 3,183,010 | 5/1965 | Bram | 277/235 |
| 3,323,785 | 6/1967 | Mather | 267/167 |
| 3,468,527 | 9/1969 | Mather | 277/235 |
| 4,655,462 | 4/1987 | Balsells | 267/1.5 |

Primary Examiner—P. W. Echols
Attorney, Agent, or Firm—Walter A. Hackler

[57] ABSTRACT

A garter-type axially resilient coil spring includes a plurality of coils canted along a centerline thereof with each coil having a trailing portion and a leading portion. The disposition of the trailing portion is defined by a back angle between the trailing portion and a line normal to the centerline and the disposition of the leading portion is defined by a front angle between the leading portion and a normal line. Specific resilient performance, or load-characteristics, of the springs are obtained by controlling a turn angle of the coil spring. At selected turn angles, springs exhibit a resilient working area bounded by steep load-deflection characteristics.

9 Claims, 3 Drawing Sheets

RADIAL SPRING COMPRESSED
AXIALLY TURNED ANGLE 90°

AXIAL SPRING TURNED
30° CLOCKWISE

AXIAL SPRING TURNED
30° COUNTERCLOCKWISE

AXIAL SPRING TURNED
60° CLOCKWISE

AXIAL FLAT SPRING

MANUFACTURING METHOD FOR CANTED-COIL SPRING WITH TURN ANGLE AND SEAL This application is a division of application Ser. No. 186,017, filed 4-25-88 now U.S. Pat. No. 4,830,344.

The present invention generally relates to canted-coil springs and seals and, more particularly, relates to canted-coil springs having a preselected turn angle for enabling a specific preselected resilient, or load-deflection, characteristics, in response to axial loading of the springs.

A general discussion of these types of garter-type springs appears in U.S. Pat. Nos. 3,323,785 and 3,468,527 to Mather. The prior art springs of Mather are limited in their application and specifically are limited to limitations in the slant angle of the coils as set forth therein.

Further advancement in spring design as set forth in companion patent applications entitled "Inside Back Angle Canted Coil Spring" and "Outside Back Angle Canted Coil Spring", Ser. Nos. 186,018 and 186,016, both (now U.S. Pat. No. 4,820,144) filed Apr. 25, 1988 have enabled the design of springs having performance characteristics beyond that of the prior art.

The force-deflection characteristics of heretofore available garter-type axial springs have been varied by changing numerous spring parameters, including the wire size, the coil height, the coil spacing, and the front angle, known as the slant angle in the hereinabove referenced Mather patents, which defines a leading portion of each canted spring coil. While these parameters can be used effectively to tailor the load-deflection characteristics of the spring, they do not dominate or enable the spring to achieve its total design potential.

A heretofore unrecognized parameter substantially affecting the performance of garter-type axial loaded springs, is set forth in the companion patent application entitled, "Outside Back Angle Canted Coil Spring". This application discloses coils which are interconnected in a manner forming a garter-type axially resilient coil spring, with the trailing portion along an outside diameter of the garter-type axially resilient coil spring, and the leading portion along an inside diameter of the garter-type axially resilient coil spring. This feature provides for the capability of tailoring a garter-type axially resilient coil spring beyond the range of conventional garter-type axially resilient coil springs heretofore known.

This feature enables a spring to be formulated with a higher load-deflection characteristics. That is, the spring is able to exert a greater force in response to a given deflection than a spring having the same dimensions and wire side with a trailing portion along the inside diameter of the spring.

As a result, these springs can be fabricated from smaller wire and have a closer coil spacing, while still exerting the same force in response to deflection as prior art springs.

It should be recognized that this characteristic is important, particularly when the springs are used in conjunction with a seal. Because seals are generally made from a soft material to enhance their sealing characteristics, they must be evenly loaded. That is, the stress concentration on the seal should be uniform in order that relatively high and low pressure points do not occur across the face of the seal, which leads to inefficient sealing. When this occurs, the high pressure points are subject to greater force and consequently greater wear, while at the same time, the necessary sealing force may not be provided in the low pressure points, the latter leads to providing unnecessarily high force concentration to the spring in order to effect proper sealing.

The present invention is related to the discovery that yet another parameter which can be utilized to design garter-type axially loaded springs having preselected load-deflection characteristics. Specifically, it has been found that the turn angle, as hereinafter defined and discussed, can be utilized in the fabrication of garter-type axially loaded springs having higher load-deflection characteristics than heretofore fabricated springs utilizing the same wire diameters. The advantages of higher loading have been hereinabove discussed. In addition, the specific relationship and working resilient range of springs made in accordance with the present invention, can also be used to advantage and provide springs with tailored load-deflection characteristics which were not heretofore possible.

It is important to recognize that while many parameters affecting the load-deflection characteristics of the garter-type springs, such as those hereinabove recited in connection with the discussion of the prior art, have little, or significantly different effect on the resilient characteristics of the spring, if the coils are not free to flex or bend in an uninhibited manner. For example, Bram discloses in U.S. Pat. No. 3,183,010, a reinforcement for a sealing element which takes the shape of a garter-type spring, and in fact, discloses a turn angle in that reinforcement element.

However, this disclosure of a reinforcement element, while in the shape of a spring, is not free to flex, because it is imbedded in the body of a sealing element so as to be flush with the surface thereof. It is obvious that when so imbedded, this reinforcement element, or spring, is not free to flex with the load-deflection characteristics that it would have in free space, that is, uninhibited deflection under load.

The spring, in accordance with the present invention, provides operational load-deflection characteristics which may be used to advantage in the design of springs for applications heretofore not possible. It is particularly true when the spring, in accordance with the present invention, is used in combination with a sealing material. In addition, the method of the present invention enables the fabrication of springs having performance specifications as hereinbelow set forth.

SUMMARY OF THE INVENTION

In accordance with the present invention, an annular axially resilient coiled spring seal includes a plurality of coils canted along a centerline thereof, with back angle means for both defining the disposition of the trailing portion of each coil with respect to a line normal to the centerline and for determining the force-deflection characteristics of the garter-type axially resilient coil spring. It should be appreciated that the determination of the force-deflection characteristics apply only to springs which are allowed to flex in an uninhibited manner as distinguished from "springs" which are filled with an elastomer, or the like, as set forth in U.S. Pat. No. 3,183,010 to Bram, the latter truly being characterized as reinforcement elements rather than springs.

In accordance with the present invention, the back angle means determines the force-deflection characteristics of the spring which includes the peak point and load, as hereinafter described in greater detail, and the working deflection range of the spring. As set forth in the hereinabove referenced companion patent application entitled, "Outside Back Angle Canted Coil Spring", by controlling the back angle, which defines the trailing portion of each coil, the resilient characteristics can be designed to meet criteria heretofore not possible without the control selection and an adjustment of the back angle.

Front angle means, hereinafter described in greater detail, are provided for defining the disposition of a leading portion of each coil with respect to the normal line. In each instance, the front angle means is greater than the back angle means.

The coils are interconnected in a manner forming a garter-type axially resilient coils and annular seal means may be provided for non-invasively supporting the garter-type axially resilient coil springs in a preselected orientation for controlling the resilient characteristics of the annular axially resilient coil spring.

Specifically, the annular seal may provide means defining a cavity for supporting and orienting the garter-type axially resilient coil spring with a turn angle of greater than zero degrees and less than 90 degrees. In addition, the garter-type axially resilient coil spring may have the trailing portion disposed along an outside diameter thereof and a leading portion disposed along an inside diameter thereof.

Additionally, the back angle may be between one degree and 45 degrees and the front angle may be less than 35 degrees.

Alternatively, the garter-type axially resilient coil spring, in accordance with the present invention may be used without the sealing material in appropriate applications.

In accordance with the present invention, a method for making a garter-type axially resilient coil spring includes the steps of fabricating a wire to produce coils canted with respect to a centerline of the garter-type axially resilient coil spring, with each coil having a leading and a trailing portion. The wire may be wound so that the leading portion is disposed at a front angle to a line normal to the centerline of the garter-type axially resilient coil spring and the trailing portion is disposed at a back angle to the normal line.

During fabricating of the wire, the magnitude of the back angle can be adjusted in order to achieve a preselected load-deflection characteristics, or resiliency, of the garter-type axially resilient coils spring.

Thereafter, two ends of the wound wire are attached in a manner forming a garter-type axially resilient coil spring in an orientation defined by a turn angle, with the turn angle being greater than zero degrees and less than 90 degrees.

BRIEF DESCRIPTION OF THE DRAWINGS

The advantages and features of the present invention will appear from the following description, when considered in conjunction with the accompanying drawings in which.

DETAILED DESCRIPTION

Figure 1:
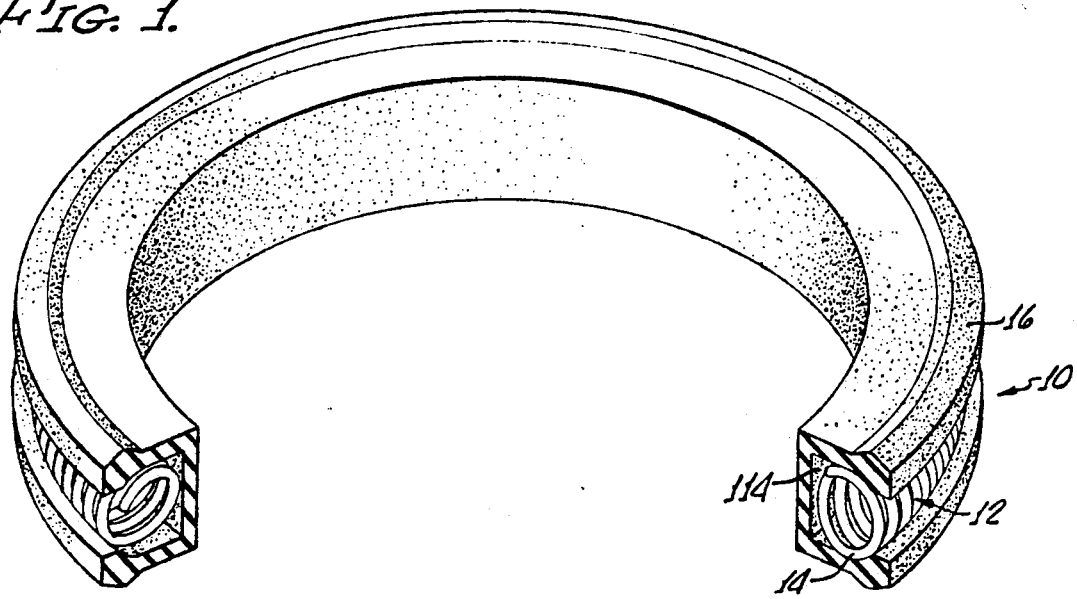
FIG. 1 is a perspective view of an annular axially resilient coil spring seal, in accordance with the present invention, generally showing a plurality of coils interconnected in a manner forming a garter-type axially resilient coil spring, with the spring being disposed in an annular seal with a preselected turn angle orientation for controlling resilient characteristics of the annular axially resilient coil spring, non-invasive support of the spring within the annular seal enabling independent working of the spring therein, thereby providing preselected force concentration on the sealing portions of the seal.

Turning now to FIG. 1, there is shown a garter-type axially resilient coil spring and seal 10, in accordance with the present invention, generally showing a garter-type axial spring 12 with a plurality of coils 14 in an annular seal 16 which provides means for non-invasively supporting the garter-type axially resilient coil spring 12, in a preselected orientation for controlling the resilient characteristics thereof, as hereinafter described in greater detail.

Figure 2:
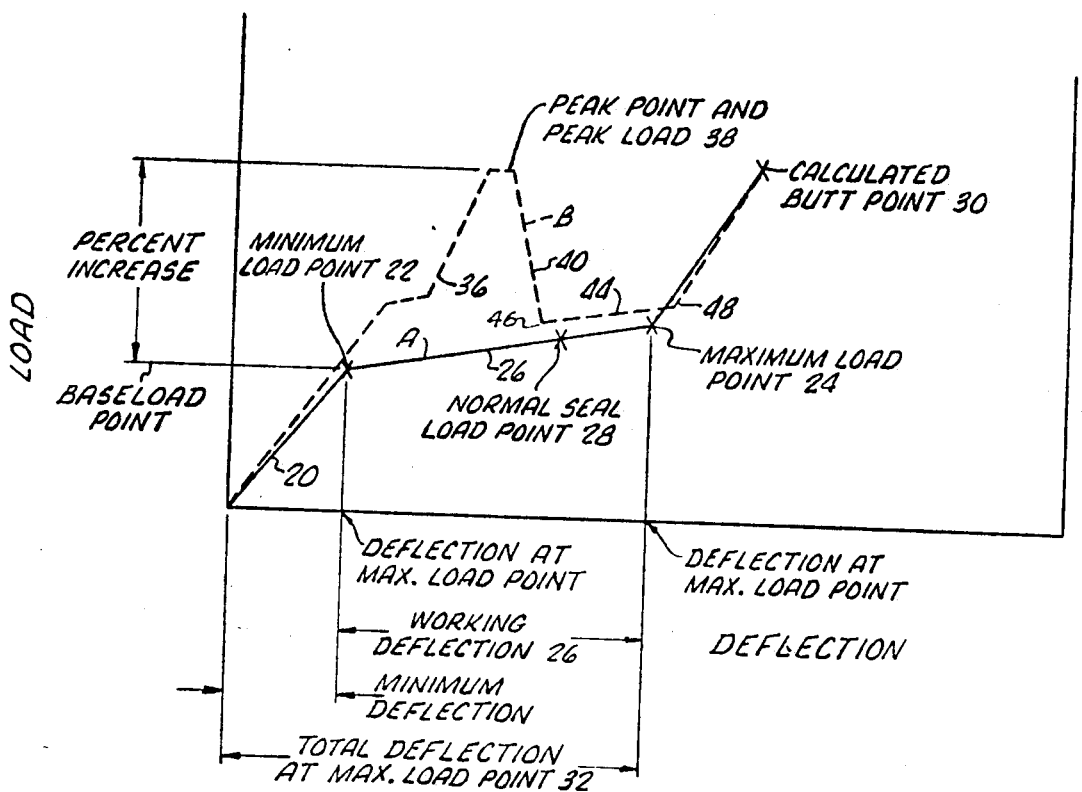
FIG. 2 shows load deflection curves for prior art springs and springs made in accordance with the present invention.

In FIG. 2, there is shown a load-deflection curve A, representative of the prior art, for the purpose of illustrating the characteristics of the canted coil garter-type axially resilient coil springs. Also shown is a load-deflection curve B for a spring made in accordance with the present invention for the purpose of illustrating the characteristics thereof.

As shown by curve A when a load is axially applied to an axial annular spring, the spring deflects in a general linear fashion as shown by the line segment 20 until it reaches minimum load point 22, which represents the point at which, after initial deflection, the load begins to remain relatively constant.

Between the minimum load point 22 and a maximum load point 24, the load-deflection curve may be constant or show a slight increase, as shown in FIG. 2. The area between the minimum load point 22 and the maximum load point 24 is known as the working deflection range 26. The spring is normally loaded for operation within this range, as indicated by point 28, for a typical spring utilized in conjunction with seal, gasket, or the like, for sealing purposes.

Loading of the spring beyond the maximum load point 24 results in abrupt deflection response until it reaches a butt point 30, which results in a permanent set in the spring as a result of overloading. Also indicated in FIG. 2, is the total deflection range 32 which is defined as the deflection between the unloaded spring and the deflection at the maximum load point 24.

Also shown in FIG. 2, is a load-deflection curve B showing the characteristics of the spring 12 made in accordance with the present invention, showing a linear load-deflection segment 36 until a peak load point 38 is reached. After the peak point 38, the load decreases with deflection in segment 40. This results in a saddle-type deflection range between the peak point 38 and the butt point 30.

This type of load-deflection characteristic may have specific advantage for spring seals which are locked in position, such as a groove, with the tension thereof being caused by the spring. In this instance, while the spring produces a relatively constant load over a given working deflection range 44, changes beyond the working range limits at points 46, 48, causes an abrupt increase in load. This causes the spring seal to be self-centering within a groove, or the like.

Other applications in which the spring of the present invention may be used to advantage include static applications where a heavy load is desired with no increase in wire diameter or spacing of coils. Still another application is where a heavy initial load is desired such as in seals subjected to cryovac temperature and the like.

Figure 3:
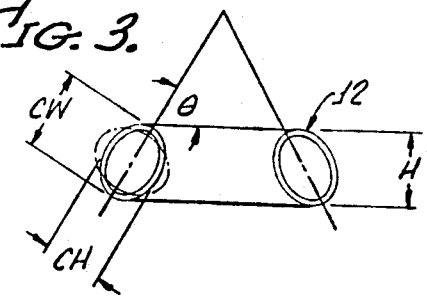
FIG. 3 is a schematic of an axially canted coil spring with turn angle $\theta$ shown for the purpose of illustrating how the turn angle $\theta$ may be calculated.

FIG. 3 shows, in schematic form, a cross-section of a canted coil spring, in accordance with the present invention, with a turn angle of $\theta$ a measured coil width of CW, a measured coil height of CH and a measured spring height H of the spring 12. As shown in FIG. 3, the turn angle may be counter clockwise (bold lines) or clockwise. (Dashed lines).

Figure 4A:
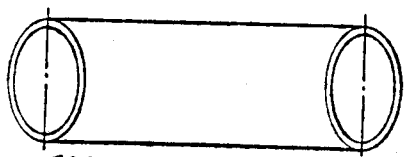
FIGS. 4a, b, c and d and e illustrate axial springs having various turn angles.
Figure 4D:
Figure 4B:
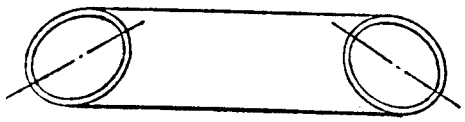
Figure 4E:
Figure 4C:
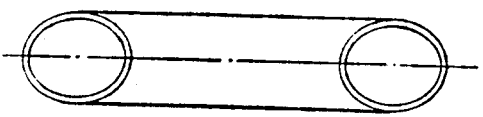

As shown in FIGS. 4a–4c, an axially flat spring may be turned up counterclockwise, for example, 30 degrees, as shown in FIG. 4b, or turned clockwise, as for example, shown in FIGS. 4c and 4d, with 30 degrees and 60 degrees turn angles, respectively. It should be appreciated that while the springs shown may be shown with a circular shape but when loaded, or compressed, to an elliptical shape, other initial shapes are possible, such as elliptical or rectangular, depending upon the configuration of the mating parts between which the spring 12 and/or seal 16 are to be placed.

As shown in the Figures, the turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading, is independent upon whether the spring is in the cone shape as shown in FIG. 4b, or an inverted cone as shown in 4d or 4e. That is, the springs in 4b and 4d will perform in identical fashion.

Figure 6B:
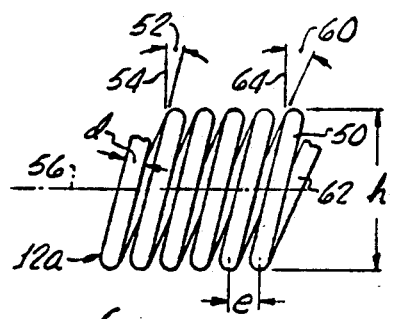
FIGS. 6a, b are side views of springs showing leading and trailing portions of coils defined by front and back angles, respectively.
Figure 6A:
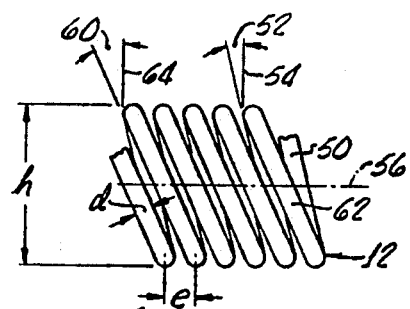
Figure 5:
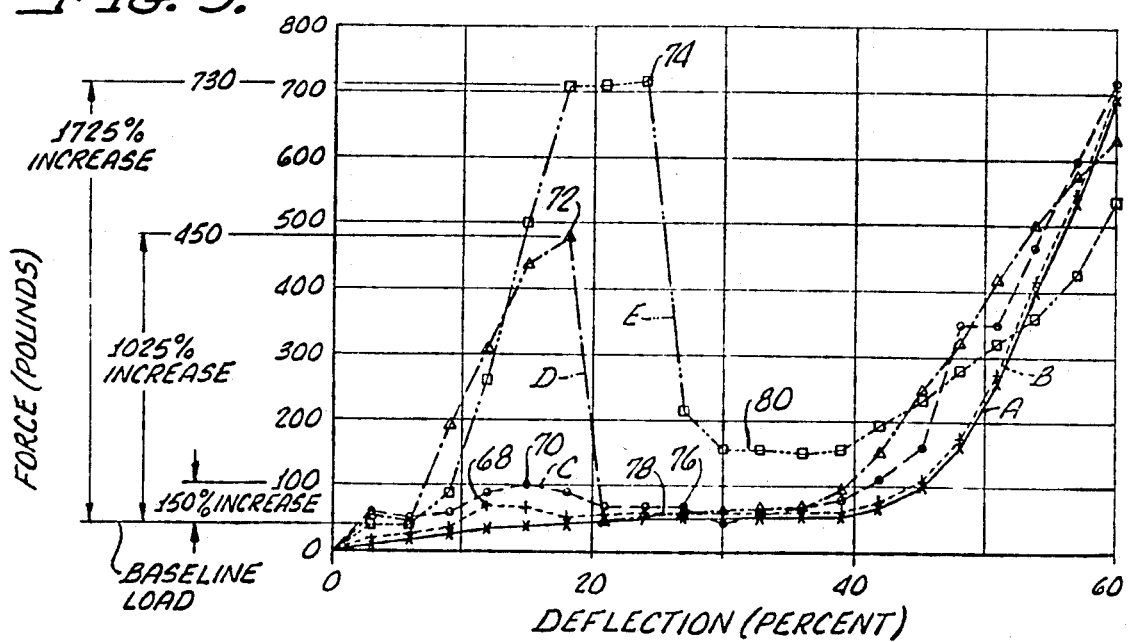
FIG. 5 is a plurality of force-deflection curves, each corresponding to an annular axially resilient coil spring having different turn angle orientation.

Curves A, B, C and D, in FIG. 5 show the force-deflection characteristics of a series of springs, with $\theta$ varied from zero degrees to 90 degrees, with a specification of these springs being set forth in Table 1. Each of the springs A, B, C, D, are identical in all respects, except for the turn angle $\theta$. As described in copending applications, Ser. Nos. 186,016 and 186,018, springs A, B, C, D, are constructed having a specific trailing portion 50 defined by a back angle 52 made between the trailing portion 50 and a normal 54 to centerline 56 of the spring. See FIGS. 6a and b. In addition, a front angle 60 defines a leading portion 62 of the spring 10 by the angle the leading portion 62 makes with a normal 64 to the centerline 56. FIG. 6a shows the spring 12 having the trailing portion 50 along the inside diameter of the spring, with FIG. 6b showing the spring 12a having the trailing portion 50 along the outside diameter of the spring. As can be seen, from FIGS. 6a and b, as each coil is traced in a circular-like manner about the centerline, each revolution includes a trailing portion and a leading portion, with the leading portion advancing movement along the centerline more than the advancement along the centerline when following the trailing portion of the coil.

TABLE 1

| Spring Height (CH) = | 0.163 in. |
|---|---|
| Coil Width (CW) = | 0.180 in. |
| Turned Height (H) = | 0.179 in. |
| Wire Diameter (WD) = | 0.222 in. |
| Coil Spacing = | 0.018 in. |
| Number of Coils = | 67 |

| Spring | Turn Angle (deg.) | Peak Load Value (lbs.) | Increase Over Base Load (%) |
|---|---|---|---|
| A | 0 | NA | NA |
| B | 15 | 100 | 100% |
| C | 58 | 100 | 150% |
| D | 76 | 450 | 1025% |
| E | 90 | 730 | 1725% |

A more detailed description of inside back angle canted coil springs and outside angle canted coil springs may be had from the hereinabove referenced copending patent applications which are herewith expressively incorporated by reference thereto. The effect of the trailing portion being disposed on the inside or the outside of the canted coil spring 12 will be hereinafter discussed in greater detail.

Turning back to FIG. 5, curve A represents a spring with a turn angle of zero and is representative of the prior art curve A, shown in FIG. 2. Curve B represents a spring having a turn angle of 15 degrees and manifests a threshold rise 68, characteristic of springs made in accordance with the present invention. This gradual rise develops into the peak load characteristics more clearly shown by curves C, D and E, corresponding to springs C, D and E. of Table 1.

As shown in FIG. 5, as the turn angle $\theta$ increases, the load increases at a maximum about 90 degrees. Importantly, after the peak load, as shown at 70, 72, 74, respectively, is achieved, the force decreases rapidly to approximately the forces shown by springs A and B. Thus, these springs have working regions 76, 78 and 80, approximately the same as unturned spring A; however, as can be seen in FIG. 5, these working areas are bounded by steep load-deflection characteristics. Springs, in accordance with the present invention, have advantages in a variety of applications, as hereinabove described. As hereinbefore mentioned, although the springs shown generally are circular in shape, they could be used in other applications in irregular shapes. That is, the spring will easily fit into other shapes than round.

As shown in Table 1, the peak load is substantially greater than the base load and in fact reaches to 1725 percent when the turn angle is 90 degrees. Hence, by using a turn angle, higher load can be provided. Consequently, as hereinbefore mentioned, a smaller wire can be used which will permit the use of more coils per inch thus decreasing the stress that will occur on the seal when loaded. This results in longer life springs because the stress concentration thereacross is more uniform.

Also, as hereinbefore pointed out, springs, in accordance with the present invention, exhibiting the force-deflection curves as shown by curve C, D and E of FIG. 5, can be used in self-locking and self-centering applications not heretofore possible by springs exhibiting force-deflection curves as shown by curve A.

Figure 7:
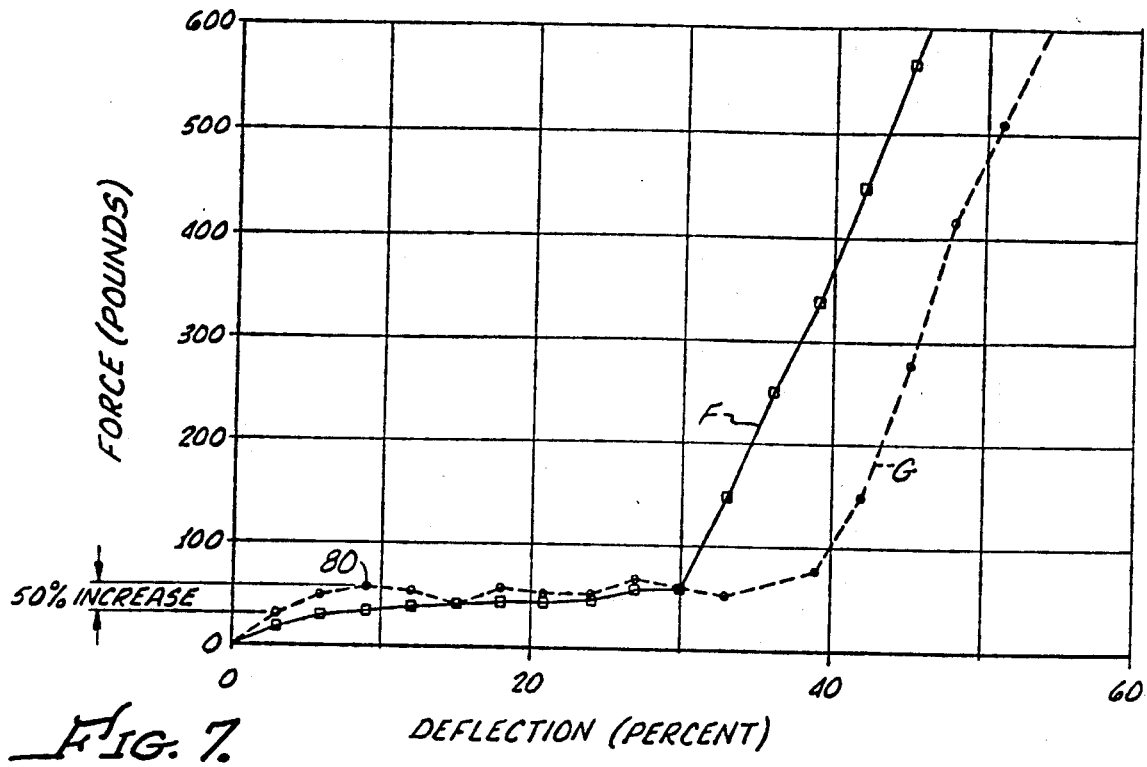
FIG. 7 is a force-deflection curve showing the effects of multiple deflection on the force-deflection characteristics of an annular axially resilient coil spring having a preselected turn angle.

It has been found that curves A through E are representative of springs whether the trailing portion is on the outside or inside of the spring. This is shown in FIG. 7 showing curves F and G corresponding to springs F and G having specifications set forth in Table 2.

TABLE 2

| Spring | # of Coils | Coil Height (in) | Coil Width (in) | Turned Height (in) | Wire Dia. (in) | Turn Angle (deg) | Coil Spring (in) | Trailing Portion |
|---|---|---|---|---|---|---|---|---|
| F | 67 | 0.162 | 0.179 | 0.164 | 0.022 | 32° | 0.018 | Outside diameter |
| G | 67 | 0.162 | 0.179 | 0.164 | 0.022 | 42° | 0.018 | Inside diameter |

As shown, curve F shows the force-deflection curve for a spring having a trailing portion on the outside diameter of the spring and curve G shows the annular spring 12 having the trailing portion on the inside of the annular spring 12, while curve G shows the load-deflection characteristics of a spring having the trailing portion on the inside of the spring. Since the turn angle of spring G is greater than the turn angle of F, a peak load portion 80 begins to manifest itself.

A great number of springs have been tested and the performance represented by curves A through G in FIGS. 5 and 7 are representative of springs made with a back angle between one degree and 45 degrees. Particularly the springs are also representative of springs wherein the front angle is less than 35 degrees.

Figure 8:
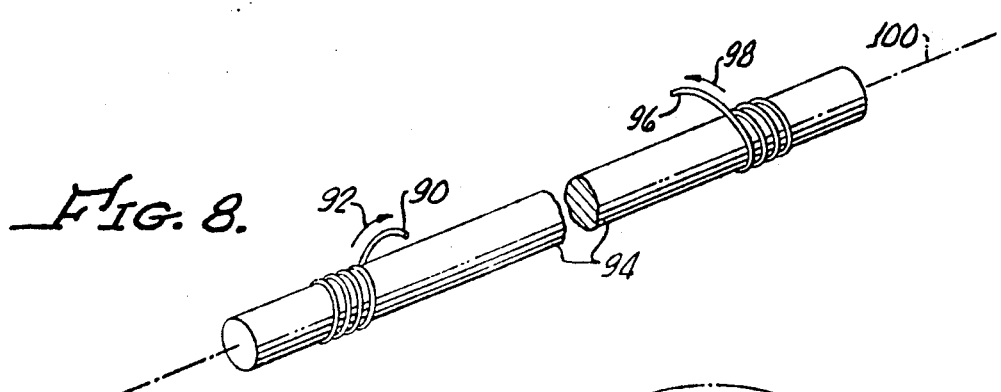
FIG. 8 is a depiction of a wire being wound to form a coil spring.

Turning to FIG. 8, there is shown a method for making a garter-type axially resilient coil spring, in accordance with the present invention, by winding a wire 100 in a clockwise fashion as shown by the arrow 102 about a mandrel 94. Alternatively, a wire 96 may be wound in a counterclockwise direction as shown by arrow 98 about the mandrel 94 as shown in FIG. 8.

Figure 9:
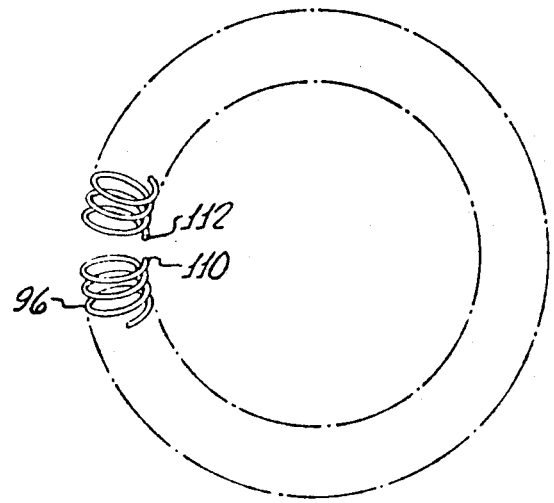
FIG. 9 illustrates the welding of ends of the coil spring to form a garter-type spring.

It should be appreciated that the wire may be fabricated counterclockwise and clockwise and, accordingly, the coils may cant clockwise or counterclockwise. In either case, the performance is the same as long as the back angle is the same. Following the fabricating of the spring, the ends 110, 112 of the wire are attached to form a garter-type axially resilient coil spring 12, with the leading portion either along the outside diameter of the spring or along the inside diameter of the spring as shown in FIG. 9. Thereafter, the spring may be inserted into a cavity 114 of the axial seal 16 as shown in FIG. 1.

What is claimed is:

1. A method for making a garter-type axially resilient coiled spring comprising the steps of:
    fabricating a wire to produce coils canted with respect to a centerline of the garter-type axially resilient coiled spring, each coil having a leading portion and trailing portion, said leading portion being disposed at a front angle to a line normal to a centerline of the garter-type axially resilient coiled spring and said trailing portion being disposed at a back angle to the normal line;
    during fabricating of the wire, adjusting the magnitude of the back angle in order to achieve preselected load-deflection characteristics of the garter-type axially resilient coiled spring; and
    attaching two ends of the wound wire in a manner forming a garter-type axially resilient coiled spring with an orientation defined by a turn angle in order to achieve selected load-deflection characteristics of the garter-type axially resilient coiled spring, said turn angle being greater than zero degrees and less than 90 degrees.

2. The method of claim 1 wherein the two ends of the wound wire are attached forming a garter-type axially resilient coiled spring with the trailing portion along the inside diameter of the garter-type axially resilient coiled spring and the leading portion along the outside diameter of the garter-type axially resilient coiled spring.

3. The method of claim 2 wherein the magnitude of back angle is adjusted to between about one degree and about 45 degrees.

4. The method of claim 3 wherein the magnitude front angle is adjusted to less than about 35 degrees.

5. The method of claim 1 wherein the turn angle is selected to provide a load-deflection characteristics having a saddle shape.

6. The method of claim 5 wherein the turn angle is greater than about 15 degrees.

7. The method of claim 5 wherein the turn angle is greater than about 60 degrees.

8. The method of claim 1 wherein the two ends of the wound wire are attached forming a garter-type axially resilient coiled spring with the leading portion along the inside diameter of the garter-type axially resilient coiled spring and the trailing portion along the outside diameter of the garter-type axially resilient coiled spring.

9. A method for making a garter-type axially resilient coiled spring comprising the steps of:
    fabricating a wire to produce coils canted with respect to a centerline of the garter-type axially resilient coiled spring, each coil having a leading portion and a trailing portion, said leading portion being disposed at a front angle to a line normal to a centerline of the garter-type axially resilient coiled spring and said trailing portion being disposed at a back angle to the normal line;
    during fabricating of the wire, adjusting the magnitude of the back angle in order to achieve preselected load-deflection characteristics of the garter-type axially resilient coiled spring; and
    attaching two ends of the wound wire in a manner forming a garter-type axially resilient coiled spring with an orientation defined by a turn angle in order to achieve selected load-deflection characteristics of the garter-type axially resilient coiled spring, said turn angle being greater than zero degrees and less than 90 degrees; and
    disposing said garter-type axially resilient coiled spring in an annular seal having a cavity for supporting and orienting said garter-type axially resilient coiled spring with a turn angle of greater than zero degrees and less than 90 degrees.

* * * * *